(12) United States Patent
Ogura et al.

(10) Patent No.: US 8,094,283 B2
(45) Date of Patent: Jan. 10, 2012

(54) LIQUID CRYSTAL DISPLAY

(75) Inventors: Kenji Ogura, Kanagawa (JP); Shuichi Tatemori, Kanagawa (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 12/465,217

(22) Filed: May 13, 2009

(65) Prior Publication Data

US 2009/0284705 A1   Nov. 19, 2009

(30) Foreign Application Priority Data

May 14, 2008   (JP) ................................. 2008-126706

(51) Int. Cl.
*G02F 1/1343* (2006.01)
(52) U.S. Cl. ........................................ 349/145; 349/103
(58) Field of Classification Search .................. None
See application file for complete search history.

(56) References Cited

U.S. PATENT DOCUMENTS

| 2002/0067448 A1 | 6/2002 | Kim et al. |
| 2010/0079709 A1* | 4/2010 | Park et al. ...................... 349/103 |
| 2011/0012821 A1* | 1/2011 | Ogura et al. .................... 345/87 |

FOREIGN PATENT DOCUMENTS

| JP | 09-022026 | 1/1997 |
| JP | 10-170924 | 6/1998 |
| JP | 11-038440 | 2/1999 |
| JP | 11-072801 | 3/1999 |
| JP | 2002-221726 | 8/2002 |
| JP | 2003-057682 | 2/2003 |

OTHER PUBLICATIONS

Japanese Patent Office Action corresponding to Japanese Serial No. 2008-126706 dated Mar. 9, 2010.

* cited by examiner

*Primary Examiner* — Mike Stahl
(74) *Attorney, Agent, or Firm* — SNR Denton US LLP

(57) ABSTRACT

A liquid crystal display including a polarizing plate having a linear polarization axis slanted in relation to a scan line, a transparent pixel electrode, an active element which drives the transparent pixel electrode, and a wire for connecting the active element and the transparent pixel electrode. The wire has an end part so shaped as to be slanted in a direction parallel to or perpendicular to the linear polarization axis.

3 Claims, 8 Drawing Sheets

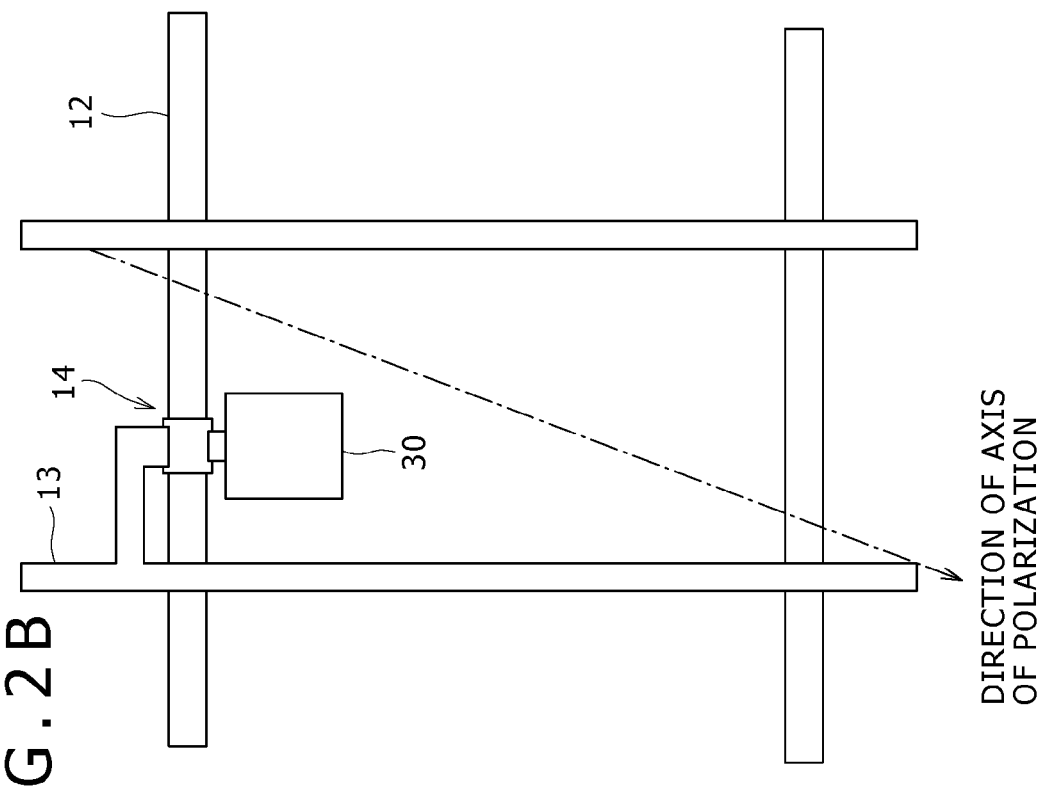
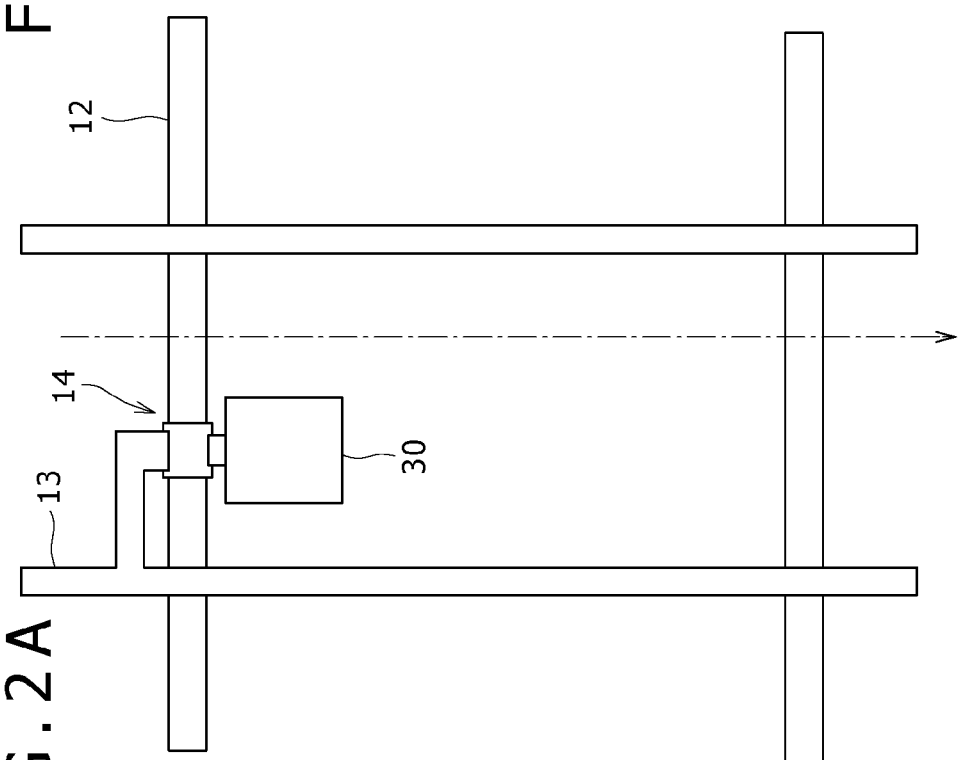

DIRECTION OF AXIS
OF POLARIZATION

DIRECTION OF AXIS
OF POLARIZATION

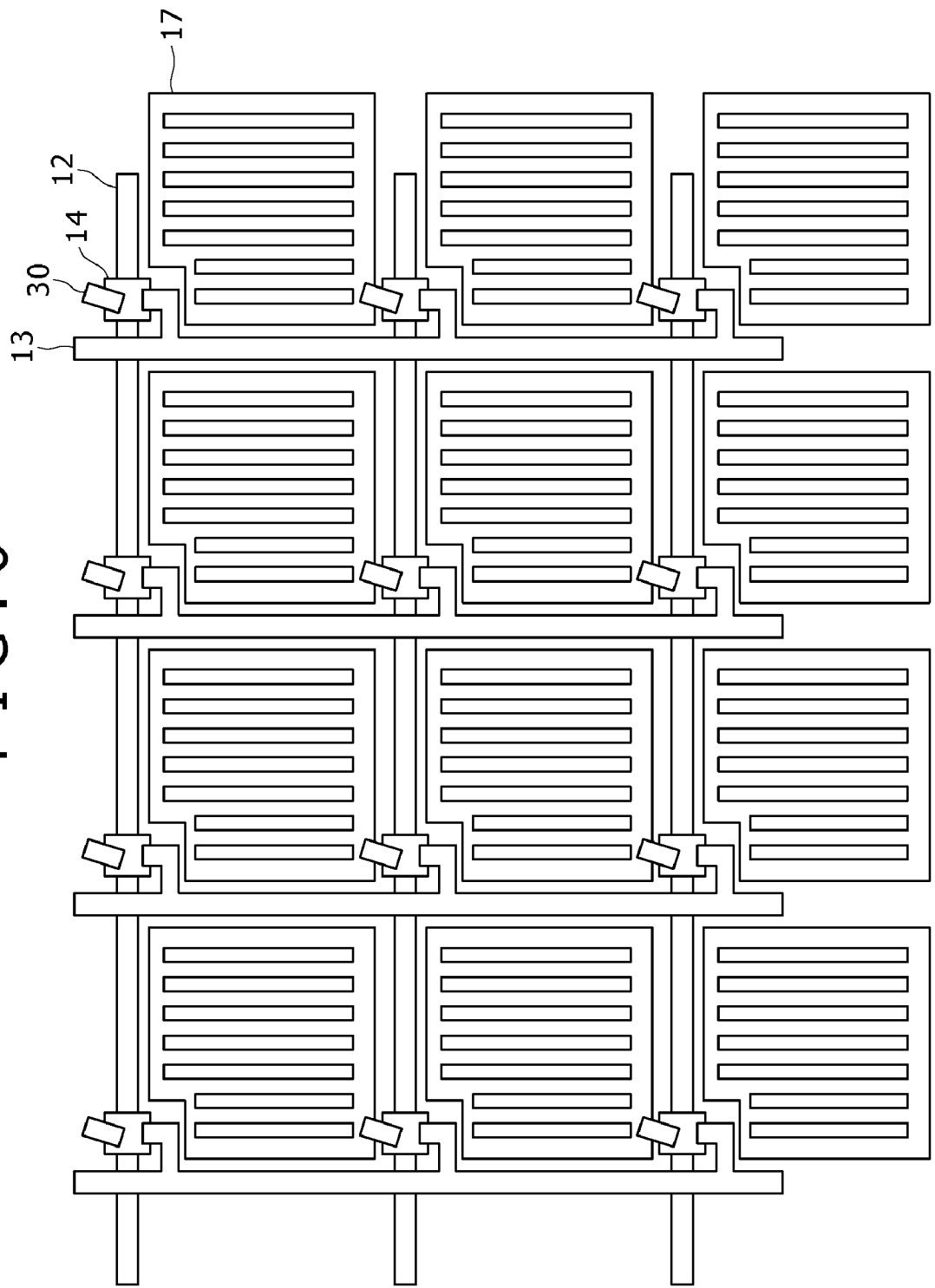

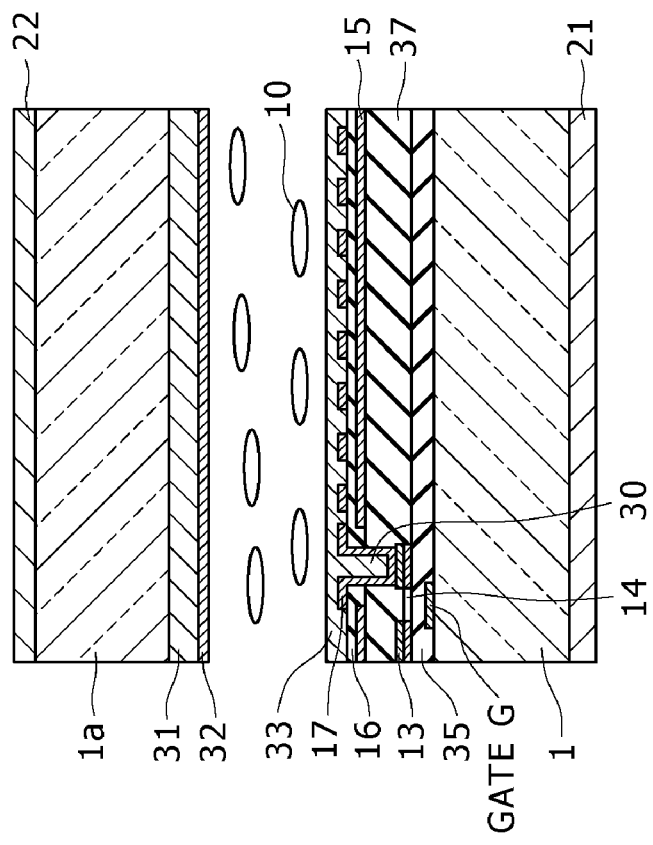
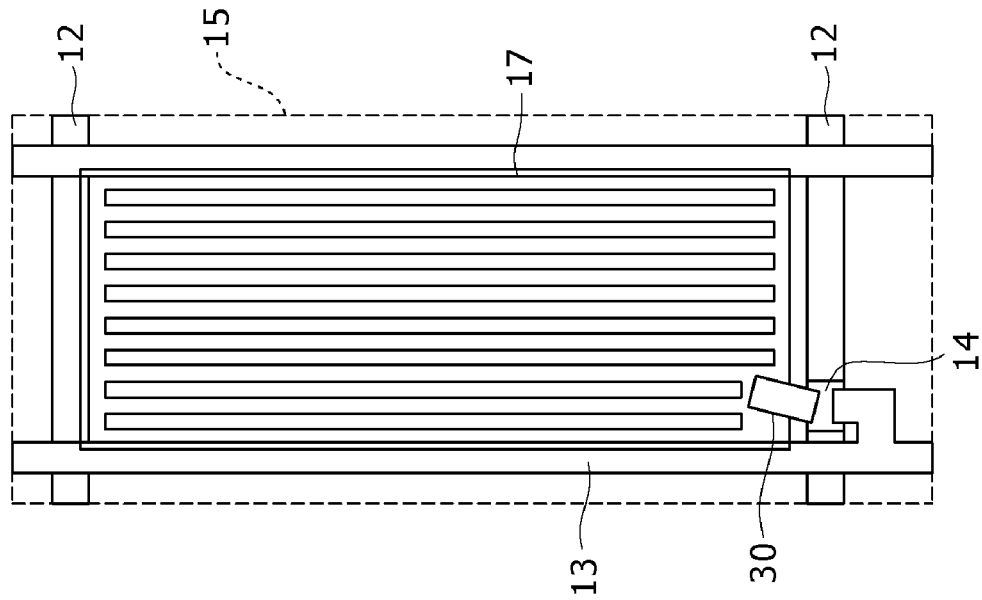

ical wires are each formed in the transmission area so as to connect the transparent pixel electrode and the thin film transistor to each other. The metallic wires are opaque, so that the linearly polarized light is shielded thereby. However, in the case where the axis of linear polarization and an end surface of the metallic wire are mutually slanted (oblique), the linearly polarized light reflected and diffracted at the end surface is disturbed in polarization state, resulting in leakage of light. Hereinafter, the end surface of the metallic wire will be referred to as "end part" or "edge part," and the phenomenon of disturbance of the linear polarization by the edge part will be referred to as "depolarization." The depolarization occurring at the edge parts of the metallic wires in the transmission areas leads to leakage of light. Since the leakage of light causes a lowering in contrast performance of the liquid crystal display, a countermeasure against it has to be taken. For example, a light-shielding method has been known. In Japanese Patent Laid-open No. 2003-057682, a counter substrate on the opposite side from a substrate having pixels is provided with a light-shielding pattern (black mask), so as to prevent the leakage of light. However, the black mask restricts the effective area (aperture area) of each of the transmission areas, thereby lowering the numerical aperture of the pixels. This has a side effect such as to lower the brightness of the screen. Furthermore, where the liquid crystal display is configured taking into account the registration errors in stacking the metallic wires and the black masks, as in Japanese Patent Laid-open No. Hei 11-072801, the numerical aperture would be further lowered.

In addition, for example, a method in which a phase plate is arranged and circular polarization is utilized has also been known. This approach, however, leads to a raised manufacturing cost and a lowered transmittance.

Thus, there is a need for a liquid crystal display in which the above-mentioned leakage of light can be restrained effectively, without sacrificing the numerical aperture of pixels.

According to an embodiment of the present invention, there is provided a liquid crystal display including a pair of substrates, a liquid crystal held between the substrates, and a polarizing plate disposed on the side of one of the substrates, wherein the polarizing plate converts externally coming incident light into linearly polarized light, and the liquid crystal controls a transmission condition of the linearly polarized light according to a voltage. The substrate on one side has scan lines, signal lines, and pixels disposed in locations where the scan lines and the signal lines intersect each other. Each of the pixels includes a transparent pixel electrode disposed in a transmission area of the linearly polarized light and operable to apply a voltage to the liquid crystal, an active element which, when selected by the scan line, drives the pixel electrode according to a signal supplied through the signal line, and a wire for connecting the active element and the pixel electrode to each other in the transmission area. The polarizing plate has an axis of linear polarization thereof set in a direction slanted in relation to the scan lines, and the wire has an end part so shaped as to be slanted into a direction parallel to or perpendicular to the axis of linear polarization.

Preferably, the active element includes a thin film transistor of which a gate is connected to the scan line, a source is connected to the signal line, and a drain is connected to the pixel electrode, the wire includes an intermediate electrode interposed between the drain and the pixel electrode which are present in different layers, and an end part of the intermediate electrode is so shaped as to be slanted into a direction parallel to or perpendicular to the axis of linear polarization. The signal line, or a part thereof, may be disposed in such a shape as to be slanted into a direction parallel to or perpendicular to the axis of linear polarization.

In the embodiments of the present invention, it is premised that the polarizing plate has its axis of linear polarization set in a direction slanted in relation to the scan lines. The scan lines, in general, are formed in the horizontal direction in regard of the screen of the liquid crystal display. An ordinary polarizing plate has its axis of polarization set to be parallel to or perpendicular to the horizontal direction of the screen. For instance, in Japanese Patent Laid-open No. 2002-221726, the axis of polarization is set perpendicular to the horizontal direction in order to increase the numerical aperture. In addition, for example in Japanese Patent Laid-open No. Hei 10-170924, for ensuring that the viewing angle distribution of contrast is symmetrical on the left and right sides, the rubbing direction is set parallel to or perpendicular to the horizontal direction and, therefore, the direction of the axis of polarization is also parallel to or perpendicular to the horizontal direction.

Depending on such conditions as optical design, however, the axis of polarization may be set in a slanted direction, for example, at an inclination of 45°, relative to the horizontal direction in regard of the screen, instead of being set parallel to or perpendicular to the horizontal direction. When a screen, for example, is viewed by a viewer wearing a polarizing sunglass, in the case where the axis of polarization of the polarizing plate is set parallel to or perpendicular to the horizontal direction of the screen, the image displayed on the screen may become invisible due to interference between the axis of polarization on the polarizing plate side and the axis of polarization on the polarizing sunglass side. On the other hand, where the axis of polarization of the polarizing plate is slanted from the horizontal direction of the screen, the interference related to the polarizing sunglass is obviated, so that the screen can be appropriately viewed by the viewer wearing the polarizing sunglass.

In the case where the axis of polarization is slanted from the horizontal direction of the screen, however, depolarization would be generated at the edge parts of the metallic wires located in the transmission areas, resulting in leakage of light, if no appropriate countermeasure is taken. Taking this problem into consideration, in the embodiments of the present invention, the edge parts (end parts) of the metallic wires are slanted to be parallel to or perpendicular to the slanted axis of linear polarization, in order to avoid the depolarization problem. As for the allowable angular range in this case, the edge parts may be slanted to be within an angular range of ±30 degrees relative to the direction parallel to or perpendicular to the axis of polarization, whereby the depolarization-preventive effect can be obtained. In this case, since the axis of linear polarization is slanted from the horizontal direction of the screen, the edge parts parallel to or perpendicular to the axis of linear polarization are naturally also slanted from the horizontal direction. Though the pattern of the metallic wires having the edge parts thus slanted has an irregular shape, depolarization is obviated and, hence, leakage of light is prevented. Therefore, the need to specially form a light leakage preventive black mask on the side of the counter substrate is eliminated, and, accordingly, a favorable numerical aperture can be secured. The embodiments of the present invention are based on the finding of the fact that the depolarization problem would not occur if the edge parts of the metallic wires are parallel to or perpendicular to the axis of linear polarization. This finding has been applied to optical design of a liquid crystal display having a slanted axis of polarization, whereby a structure free of leakage of light has been obtained successfully.

BRIEF DESCRIPTION OF THE DRAWINGS

FIGS. 2A and 2B are schematic plan views illustrating a first reference example and a second reference example of a liquid crystal display;

FIG. 6 is a plan view showing an example of a liquid crystal display of the in-plane field system;

FIGS. 7A and 7B are schematic views illustrating a configuration corresponding to one pixel of the liquid crystal display of the in-plane field system.

DETAILED DESCRIPTION OF THE PREFERRED EMBODIMENTS

Figure 1A:
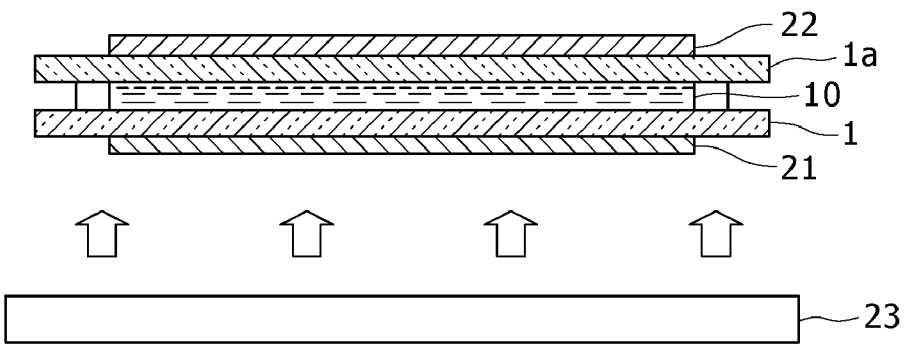
FIGS. 1A and 1B schematically illustrate a first embodiment of the liquid crystal display pertaining to the present invention.
Figure 1B:
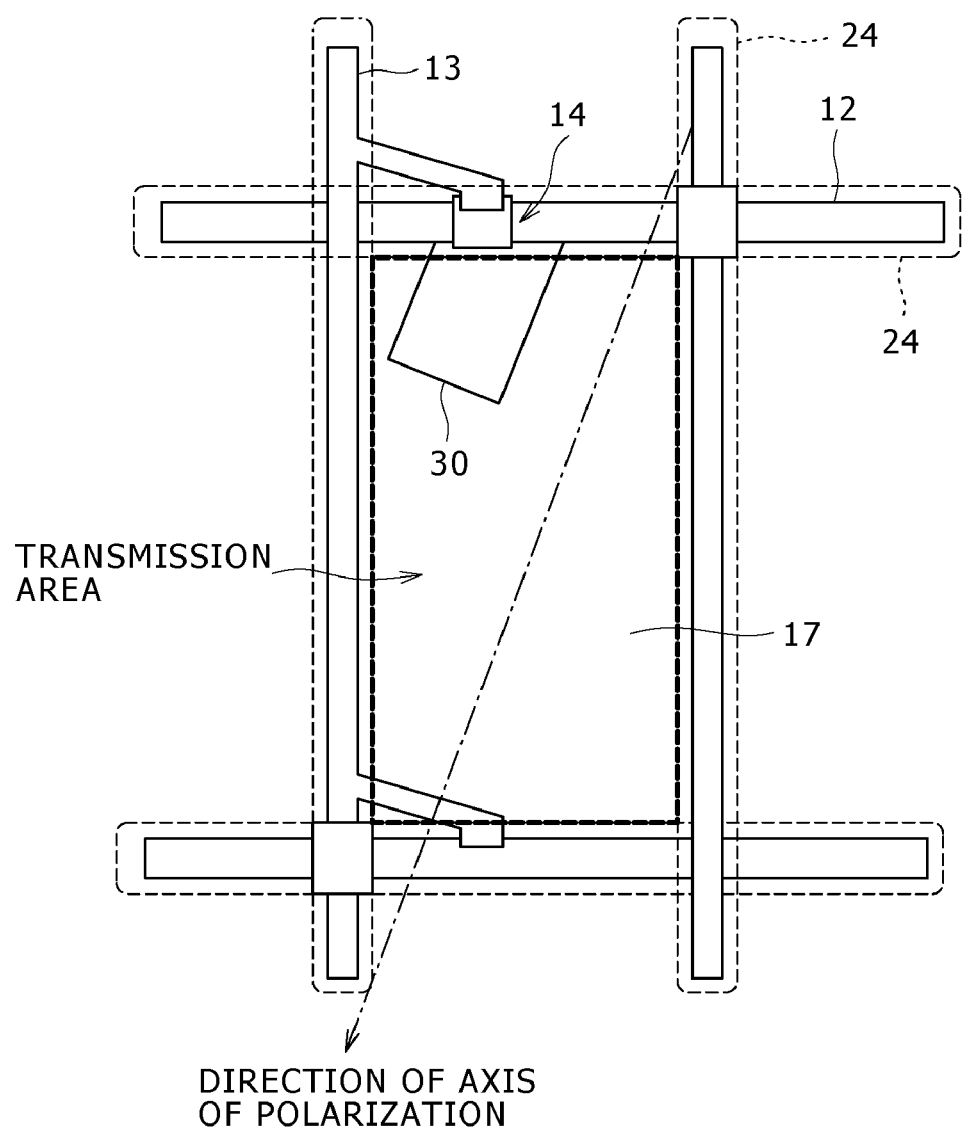

Now, embodiments of the liquid crystal display pertaining to the present invention will be described in detail below referring to the drawings. FIGS. 1A and 1B schematically illustrate a first embodiment of the liquid crystal display pertaining to the present invention, in which FIG. 1A illustrates the overall sectional structure of the liquid crystal display, and FIG. 1B is a schematic plan view of a structure corresponding to one pixel.

As shown in FIG. 1A, the liquid crystal display includes a pair of substrates 1 and 1a, a liquid crystal 10 held therebetween, and a polarizing plate 21 disposed on the side of one of the substrates 1. The polarizing plate 21 converts externally coming incident light into linearly polarized light. In this embodiment, the liquid crystal display is of the transmission type in which a backlight 23 is provided. The polarizing plate 21 converts illuminating light emitted from the backlight 23 into linearly polarized light. The liquid crystal 10 controls the transmission condition of the linearly polarized light according to a voltage, so as to display an image.

This embodiment addresses the active matrix type, in which a pixel array is formed on the side of the substrate 1. Therefore, the substrate 1 may in some cases be referred to as "array substrate." On the other hand, the substrate 1a opposed to the array substrate 1 may be referred to as "counter substrate." In this embodiment, the counter substrate 1a is also accompanied by a polarizing plate 22. In order to distinguish the two polarizing plates from each other, the polarizing plate 21 on the array substrate 1 side may in some cases be referred to as "first polarizing plate," and the polarizing plate 22 on the counter substrate 1a side may be referred to as "second polarizing plate." The first polarizing plate 21 is a polarizing element by which the illuminating light emitted from the backlight 23 is converted into the linearly polarized light. On the other hand, the second polarizing plate 22 is an analyzer for detecting the polarized light having an axis of polarization controlled by the liquid crystal 10. It is to be noted here, however, that the two polarizing plates may not necessarily be both provided in the embodiments of the present invention, and a configuration suffices in which one polarizing plate is provided at least on the side nearer to the incident light.

As shown in FIG. 1B, the array substrate 1 is provided with scan lines 12, signal lines 13, and pixels disposed respectively in locations where the scan lines 12 and the signal lines 13 intersect each other. The pixel includes a basically transparent pixel electrode 17, a thin film transistor (TFT) 14 as an active element, and a wire 30. The pixel electrode 17 is provided in a transmission area of the linearly polarized light, for impressing a voltage on the liquid crystal 10. As shown in the figure, the transmission area corresponds to each of divisions that are demarcated in a grid pattern by the scan lines 12 and the signal lines 13 intersecting each other. The transparent pixel electrode 17 is formed over the whole area of each of the divisions.

The TFT 14, when selected by the scan line 12, drives the pixel electrode 17 according to a picture signal supplied through the signal line 13. Specifically, the gate of the TFT 14 is connected to the scan line 12, the source of the TFT 14 is connected to the signal line 13, and the drain of the TFT 14 is connected to the pixel electrode 17. It is to be noted here that the embodiments of the present invention are not only applicable to the case where the active element is a TFT 14 but also applicable to the cases where the pixel electrode 17 is driven by use of an active element other than the TFT 14. The wire 30 connects the drain of the TFT 14 with the pixel electrode 17 to each other in the transmission area. Herein, the wire 30 connecting the TFT 14 and the pixel electrode 17 to each other in the transmission area is referred to as "contact wire." As is clear from the figure, the contact wire 30 is intermediately provided in the transmission area, and occupies a part of the pixel aperture. Therefore, the numerical aperture of the pixel is restricted by an amount corresponding to the area occupied by the contact wire 30. Incidentally, on the side of the counter substrate 1a, there is provided a black matrix 24 corresponding to the grid pattern of the scan lines 12 and the signal lines 13 intersecting each other. Accordingly, the actual pixel aperture is determined by each section in the black matrix 24 formed in the grid pattern. It should be noted, however, that the black matrix is not an indispensable component of the liquid crystal display, and may be omitted in some cases.

In the liquid crystal display, the polarizing plate 21 has an axis of linear polarization thereof set in a direction slanted in relation to the scan lines 12. In other words, the axis of polarization is slanted relative to the scan lines 12, instead of being parallel to or perpendicular to the scan lines 12. Correspondingly to this configuration, the contact wire 30 intermediately provided in each transmission area has its end part (edge part) shaped to be parallel to or perpendicular to the axis of linear polarization. With the edge parts of the contact wires 30 thus slanted so as to be perpendicular to or parallel to the direction of the axis of linear polarization, depolarization due to diffraction and reflection at the edge parts can be obviated. It is to be noted here that the edge parts of the wires 30 may not necessarily be inclined so as to be strictly perpendicular to or parallel to the direction of the axis of polarization, and they may be slanted to be within a practical angular range of ±30 degrees from the direction parallel to or perpendicular to the axis of polarization, whereby the depolarization-preventing effect can be obtained. With the depolarization thus prevented, leakage of light in the vicinity of the contact wires 30 is obviated. As a result, the need for the black mask ordinarily provided on the counter substrate 1a side for the purpose of optically shielding the contact wires 30 is eliminated. Accordingly, it is possible to realize a liquid crystal display in which lowering in contrast can be obviated and which has a high numerical aperture.

In the embodiments of the present invention, it is premised that the axis of linear polarization of the polarizing plate 21 is set in a direction which is oblique to the scan lines 12. In general, the scan lines 12 are formed along the horizontal direction in regard of the screen of a liquid crystal display. A normal polarizing plate has its axis of polarization set parallel to or perpendicular to the horizontal direction in regard of the screen. Depending on such conditions as optical design, however, the axis of polarization may be set in a slanted direction, for example, at an inclination of 45°, relative to the horizontal direction in regard of the screen, instead of being set parallel to or perpendicular to the horizontal direction. When for example a screen is viewed by a viewer wearing a polarizing sunglass, in the case where the axis of polarization of the polarizing plate is set parallel to or perpendicular to the horizontal direction in regard of the screen, the image displayed on the screen may become invisible due to interference between the axis of polarization on the polarizing plate side and the axis of polarization on the polarizing sunglass side. On the other hand, where the axis of polarization of the polarizing plate is slanted from the horizontal direction of the screen, the interference related to the polarizing sunglass is obviated, so that the screen can be appropriately viewed by the viewer wearing the polarizing sunglass.

In the case where the axis of polarization is slanted from the horizontal direction of the screen, however, depolarization would be generated at the edge parts of the metallic wires 30 located in the transmission areas, with the result of leakage of light, if no appropriate countermeasure is taken. Taking this problem into consideration, in the embodiments of the present invention, the edge parts (end parts) of the metallic wires 30 are slanted to be parallel to or perpendicular to the slanted axis of linear polarization, in order to avoid the depolarization problem. In this case, since the axis of linear polarization is slanted from the horizontal direction of the screen, the edge parts parallel to or perpendicular to the axis of linear polarization are naturally also slanted from the horizontal direction of the screen. Though the pattern of the metallic wires 30 having the edge parts thus slanted has an irregular shape, depolarization is obviated and, hence, leakage of light is prevented. Therefore, the need to specially form a light leakage preventive black mask on the side of the counter substrate 1a is eliminated, and, accordingly, a favorable numerical aperture of the pixels can be secured. The embodiments of the present invention are based on the finding of the fact that the depolarization problem would not occur if the edge parts of the metallic wires 30 are parallel to or perpendicular to the axis of linear polarization. This finding has been applied to optical design of a liquid crystal display having a slanted axis of polarization, whereby a light-leakage-free structure has been obtained successfully.

FIGS. 2A and 2B are schematic plan views illustrating reference examples of the liquid crystal display. For easy understanding, the parts corresponding to those in the first embodiment of the present invention shown in FIG. 1B are denoted by the corresponding reference numerals.

In a first reference example shown in FIG. 2A, the direction of the axis of polarization of a polarizing plate is disposed to be perpendicular to scan lines 12. In this case, edge parts of contact wires 30 are also vertical to or parallel to the direction of the axis of polarization. Therefore, depolarization does not occur, and hence leakage of light does not occur, at the edge parts of the contact wires 30. In the case where the axis of polarization is disposed orthogonal to the scan lines 12 as shown in the figure, however, a problem occurs when the screen is viewed by a viewer wearing a polarizing sunglass. Specifically, the axis of polarization on the polarizing sunglass side and the axis of polarization on the liquid crystal display side are parallel to or orthogonal to each other, so that interference may occur between the axes of polarization, resulting in that the image on the screen may not be viewed correctly by the viewer.

FIG. 2B shows a second reference example of the liquid crystal display. In the second reference example, the direction of the axis of polarization is slanted in relation to the scan lines 12. Therefore, in the case of observing the screen through a polarizing sunglass, the above-mentioned interference between the axes of polarization can be restrained, so that the screen can be observed in a satisfactory manner. However, the edge parts of the contact wires 30 are not set orthogonal to or parallel to the direction of the axis of polarization but are slanted relative to the polarization axis direction. Consequently, the linearly polarized light undergoes diffraction and reflection at the edge parts of the contact wires 30, resulting in depolarization. This causes leakage of light in the vicinity of the contact wires 30. In order to block the leakage of light, it may be necessary to form a black mask somewhat larger than the contact wires 30 on the counter substrate side, and the numerical aperture would be sacrificed accordingly.

Figure 3:
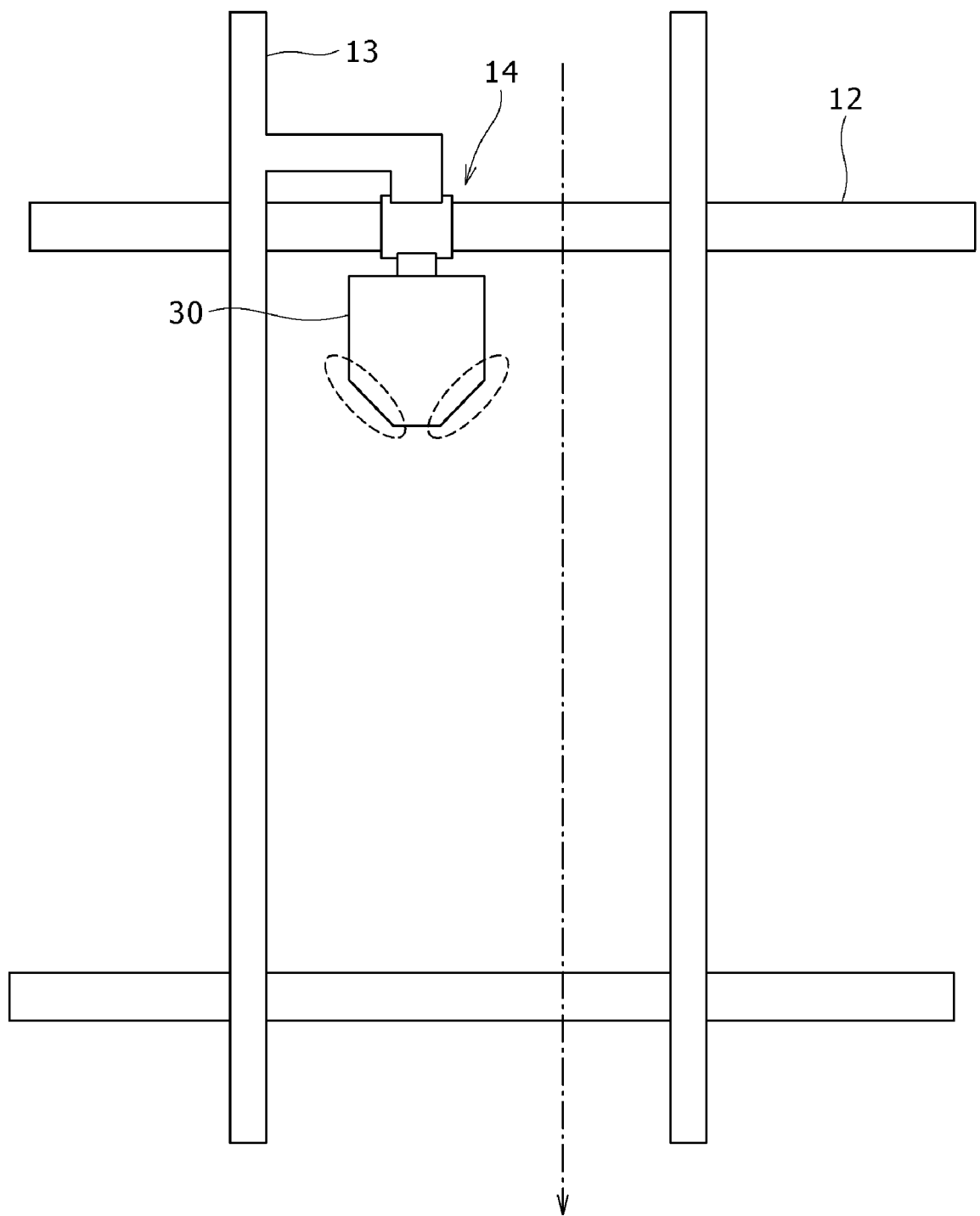
FIG. 3 is a schematic plan view showing a third reference example of a liquid crystal display.

FIG. 3 is a schematic plan view illustrating a third reference example of the liquid crystal display. In the case where the liquid crystal display is used exclusively in a room or the like, it is unnecessary to slant the direction of the axis of polarization; thus, products are naturally manufactured in which the axis of polarization is set vertical to the scan lines 12 as shown in the figure. In this case, for enhancing the numerical aperture of the pixels as much as possible, it is effective to partly cut off the pattern of the contact wire 30 present in the transmission area. In the example shown in the figure, two corners of the originally rectangular contact pattern 30 are cut away, so as to enhance the numerical aperture of the pixel. In this case, however, the thus cut edge parts of the contact wire 30 are not vertical to or parallel to the direction of the axis of polarization, so that depolarization would occur at the thus cut-off parts, causing leakage of light. In order to prevent the leakage of light, therefore, it would be necessary to form a black mask somewhat larger than the contact wires 30 on the counter substrate side. As a result, the desired enhancement of the numerical aperture of the pixels may not be achieved.

Figure 4:
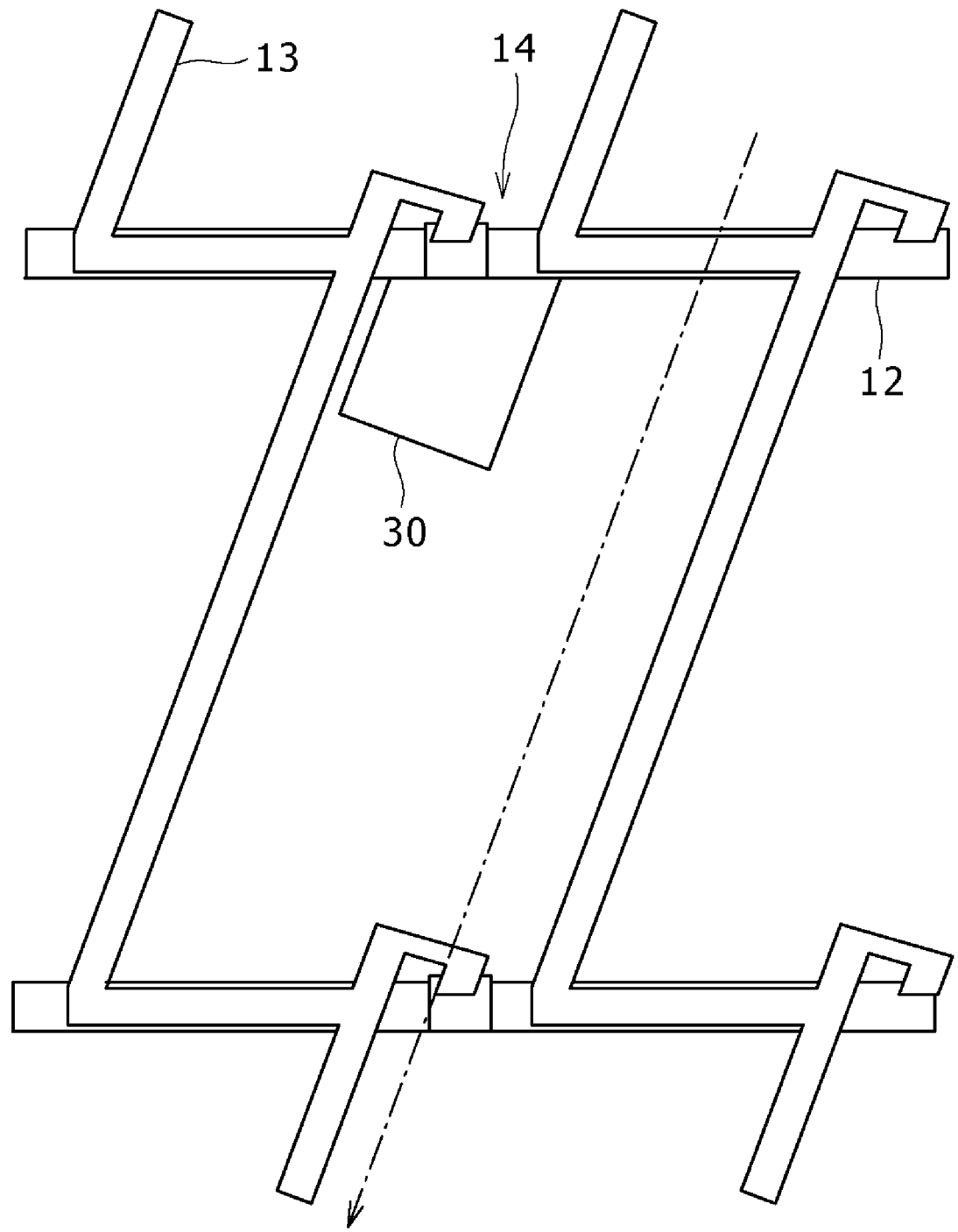
FIG. 4 is a schematic plan view showing a second embodiment of the liquid crystal display pertaining to the present invention.

FIG. 4 is a schematic plan view illustrating a second embodiment of the liquid crystal display pertaining to the present invention. For ease of understanding, the parts corresponding to those in the first embodiment shown in FIG. 1B are denoted by the corresponding reference numerals. This embodiment differs from the first embodiment in that signal lines 13 are set parallel to the direction of the axis of polarization. In other words, the signal lines 13 are slanted in relation to scan lines 12, like the axis of polarization. This results in that edge parts of the signal lines 13 are also parallel to the direction of the axis of polarization, so that depolarization would basically not occur at the edge parts of the signal lines 13. Therefore, the need to provide the counter substrate with a black matrix corresponding to the signal lines 13 is eliminated, and the numerical aperture of the pixels is enlarged accordingly.

Figure 5:
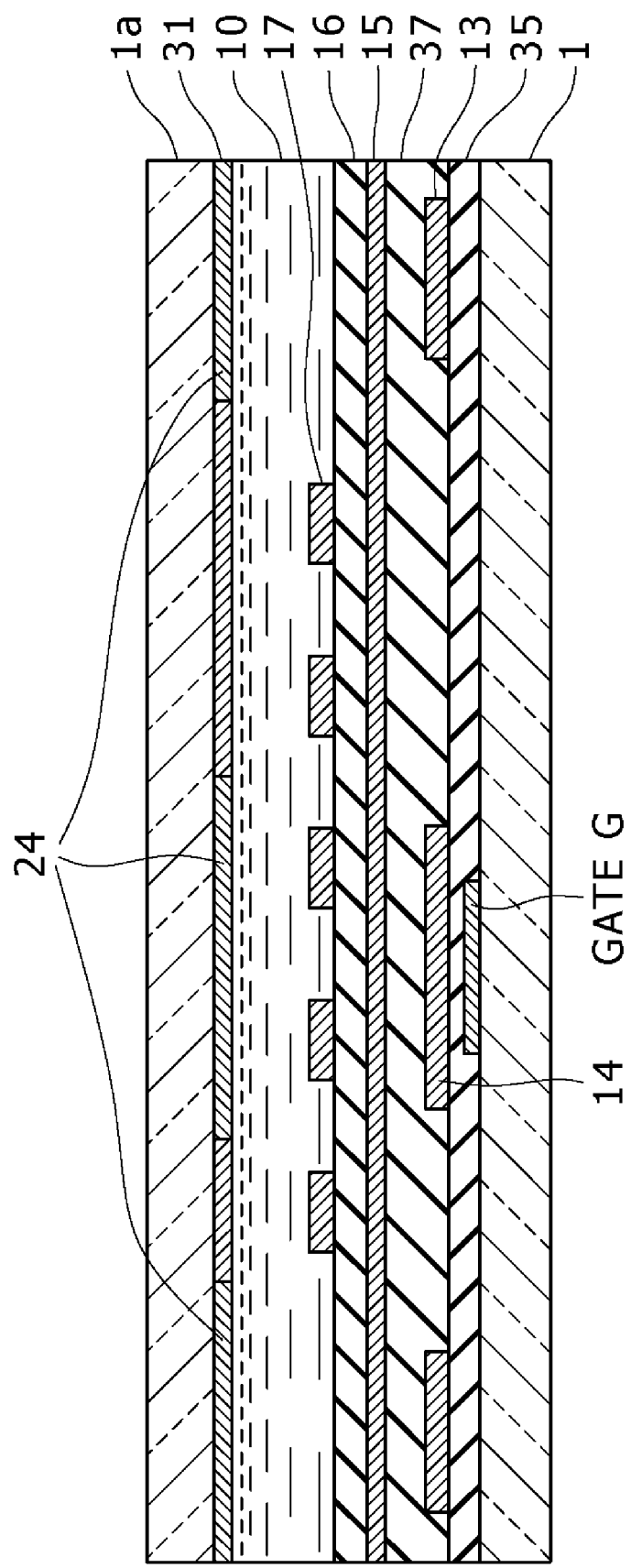
FIG. 5 is a schematic sectional view showing a sectional structure corresponding to one pixel of the liquid crystal display pertaining to the embodiments of the present invention.

FIG. 5 is an enlarged sectional view of a structure corresponding to one pixel of the liquid crystal display. An array-side glass substrate 1 is provided with gates G of thin film transistors (TFTs) 14. The gate G is covered with a gate insulator film 35. On the gate insulator film 35, a semiconductor thin film to be device regions is formed in island-like shapes. In addition, signal lines 13 and other wires are also formed. The signal line 13 is covered with an inter-layer insulator film 37, on which a common electrode 15 is disposed. Pixel electrodes 17 are formed over the common electrode 15, with an insulator film 16 interposed therebetween. The pixel electrodes 17 are formed in the form of stripes, and are operative to generate a fringe field between the common electrode 15 and themselves. The description has been made of the case where the thin film transistor is of the bottom gate type, for example, but the thin film transistor is not limited to the bottom gate type. A thin film transistor of, for example, the top gate type may also be adopted.

On the other hand, the counter-side glass substrate la is provided with a color filter 31. A liquid crystal 10 is held between the color filter 31 and the pixel electrodes 17. Of the liquid crystal 10, the orientation condition is changed according to the above-mentioned fringe field. The color filter 31 is partly admixed with a black coloring matter, to form light shielding layers 24. The light shielding layers 24 are for blocking the leakage of light from the array-side glass substrate 1. According to this embodiment of the present invention, leakage of light can be prevented from occurring at the edge parts of the metallic wires. Therefore, the light shielding layers 24 provided on the side of the counter-side glass substrate 1a can also be reduced as much as possible, which leads to an improvement in the numerical aperture of the pixels.

FIG. 6 is a schematic plan view illustrating an embodiment in which the present invention is applied to an FFS mode liquid crystal display. In the case of realizing active matrix driving in the FFS mode liquid crystal display, as shown in FIG. 6, pluralities of scan lines 12 and signal lines 13 are arranged in a matrix form on an array substrate, and pixel electrodes 17 in a slit form (combteeth-like shape) are provided respectively at intersections of the scan and signal lines 12, 13. The pixel 17 is driven by a TFT 14. A contact wire 30 connecting the TFT 14 and the pixel electrode 17 to each other is irregular in shape, as shown in the figure, whereby leakage of light due to depolarization is prevented from occurring.

FIGS. 7A and 7B are schematic views illustrating one pixel in the liquid crystal display of the active matrix in-plane field system (FFS mode) shown in FIG. 6, wherein FIG. 7A is a plan view of a structure corresponding to one pixel, and FIG. 7B is a sectional view of the same. As shown in FIG. 7A, a substrate constituting the liquid crystal display is provided thereon with the scan lines 12 along a row direction and the signal lines 13 along a column direction. The scan lines 12 and the signal lines 13 intersect each other in a grid pattern, each grid cell corresponding to one pixel. The pixel is provided with a common electrode 15 and the pixel electrode 17. The pixel electrode 17 is disposed over the common electrode 15, with an inter-layer insulator film interposed therebetween, and is formed in a combteeth-like pattern. A voltage is impressed between the pixel electrode 17 and the common electrode 15 so as to apply an in-plane field to the liquid crystal, thereby switching the orientation condition of the liquid crystal. For impressing a voltage on the pixel electrode 17, each pixel is provided with the thin film transistor (TFT) 14. A gate electrode of the TFT 14 is connected to the corresponding scan line 12, a source electrode of the TFT 14 is connected to the corresponding signal line 13, and a drain electrode of the TFT 14 is connected to the corresponding pixel electrode 17 through the contact wire 30. The common electrode 15 for each pixel is connected to a common potential.

As shown in FIG. 7B, the liquid crystal display includes a pair of substrates 1 and 1a disposed opposite to each other with a predetermined spacing (gap) therebetween, and the liquid crystal 10 disposed in the spacing (gap). A color filter 31 and an alignment film 32 are laminated on the inside surface of the upper transparent substrate 1a. Polarizing plates 21, 22 are disposed respectively on the sides of the outside surfaces of the pair of substrates 1, 1a.

The lower transparent substrate 1 is provided with the above-mentioned common electrode 15, the pixel electrodes 17 formed in the combteeth-like pattern and disposed over the common electrode 15 through an inter-layer insulator film 16 therebetween, an alignment film 33 (alignment layer) disposed on the pixel electrodes 17 so as to align the molecules of the liquid crystal 10, and switching means for impressing a voltage between the pixel electrodes 17 and the common electrode 15 to change the orientation conditions of the liquid crystal layer 10. In this embodiment, the switching element is the thin film transistor (TFT) 14, as above-mentioned. The thin film transistors (TFTs) 14 are covered with an inter-layer insulator film 37, and are connected to the pixel electrodes 17 through the contact wires 30. Specifically, the gate G of the thin film transistor (TFT) 14 is connected to the scan line 12 (not shown). A semiconductor thin film is formed over each gate G, with a gate insulator film 35 interposed therebetween, and is divided into a source and a drain. As above-mentioned, the source is connected to the signal line 13, and the drain is connected to the pixel electrode 17 through the contact wire 30.

When a voltage according to a picture signal is impressed on the side of the pixel electrode 17 while the common electrode 15 is connected to a common potential, an in-plane field is applied to the liquid crystal layer 10, and its orientation condition is switched into a light-scattering condition; thus, the transmittance of the liquid crystal is modulated according to the picture signal. Incidentally, the in-plane field system is not limited to the FFS mode in which the common electrode 15 and the pixel electrodes 17 are separated from each other by the insulator film; for example, an IPS mode in which combteeth-shaped electrodes are combined on the same plane or other modes may also be adopted. Basically, the in-plane field system includes all modes wherein switching is conducted in the plane of a substrate.

Figure 8:
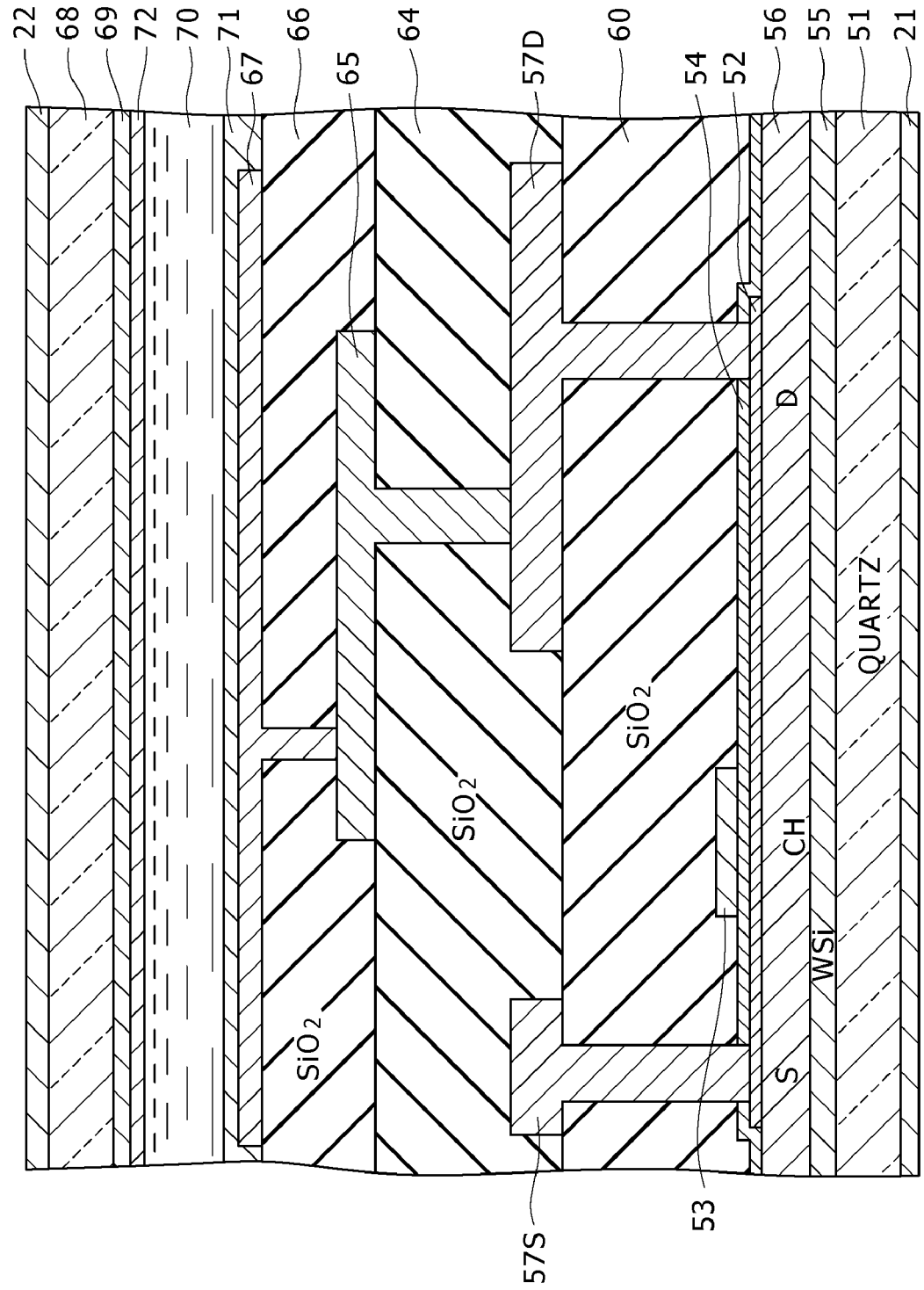
FIG. 8 is a schematic sectional view showing an example of a liquid crystal display of the vertical field system.

The embodiments of the present invention are not limited to the in-plane field system illustrated in FIGS. 7A and 7B. The embodiments of the present invention are applicable also to liquid crystal displays of the vertical field system in which a voltage is impressed between a pixel array substrate and a counter substrate. FIG. 8 is a schematic sectional view illustrating an example of a liquid crystal display of the vertical field system. This display includes scan lines provided along a row direction, signal lines provided along a column direction, and pixels located respectively at intersections of the scan and signal lines, which are formed on a substrate 51 in an integrated manner. An under layer 56 is formed over the substrate 51 made of quartz, with a light shielding film 55 therebetween. The sectional view shown in FIG. 8 is a schematic partial sectional view illustrating a structure corresponding to one pixel. In the figure, a signal line electrode 57S is connected to the signal line (not shown) provided along the column direction, and a gate electrode 53 is connected to the scan line (not shown) provided along the row direction. Polarizing plates 21, 22 are disposed respectively on the sides of the outside surfaces of the pair of substrates 51, 68.

The pixel includes an electro-optic element, and a thin film transistor (TFT) which is connected to the scan line and the signal line and is operative to drive the electro-optic element. The electro-optic element includes a liquid crystal 70 held between a pixel electrode 67 and a counter electrode 69. Incidentally, the counter electrode 69 is formed on the counter substrate 68. The pixel electrodes 67 and the counter electrode 69 are covered respectively by alignment films 71, 72 for aligning the molecules of the liquid crystal 70.

The thin film transistor includes a polysilicon film 52, the gate electrode 53, and a gate oxide film 54 disposed between the polysilicon film 52 and the gate electrode 53. The polysilicon film 52 includes a channel region CH matched to the gate electrode 53, and conductive regions which have a predetermined impurity concentration and function as a source S or a drain D.

The TFT having such a configuration is covered with an inter-layer insulator film 60 formed of $SiO_2$. The signal line electrode 57S and a pixel potential lead-out electrode 57D are formed on the inter-layer insulator film 60. These electrodes 57S, 57D are connected respectively to the source S and the drain D of the TFT through contact holes formed in the inter-layer insulator film 60.

The signal line electrode 57S and the pixel potential lead-out electrode 57D are covered with an inter-layer insulator film 64 formed of $SiO_2$, similarly. A pixel potential lead-out electrode 65 is formed on the inter-layer insulator film 64. This pixel potential lead-out electrode 65 is connected to the pixel potential lead-out electrode 57D on the lower side through a contact hole formed in the inter-layer insulator film 64 beneath itself.

The pixel potential lead-out electrode 65 is covered with an inter-layer insulator film 66. The above-mentioned pixel electrode 67 is formed on the inter-layer insulator film 66. The pixel electrode 67 is connected to the pixel potential lead-out electrode 65 through a contact hole formed in the inter-layer insulator film 66. Incidentally, the pixel potential lead-out electrode 65 is formed of metallic Ti, and functions also as a face-side light shielding film. The face-side light shielding film 65 and the back-side light shielding film 55 shield the TFT therebetween from light on the upper and lower sides. The pixel electrode 67 may be composed, for example, of a light-reflective metallic conductive film. In this display, driving voltages are impressed between the pixel electrodes 67 and the counter electrode 69 so as to modulate the transmittance of the liquid crystal 70 on a pixel basis, thereby displaying an image.

In the liquid crystal display of the vertical field system as above-mentioned, the pixel potential lead-out electrode 65 corresponds to the contact wire under consideration in the embodiments of the present invention. To be more specific, the pixel potential lead-out electrode 65 is a contact wire which connects the pixel electrode 67 and the drain D of the TFT to each other and which is disposed underneath the transparent pixel electrode 67 (i.e., disposed in the transmission area). End parts (edge parts) of the pixel potential lead-out electrodes 65 are patterned so as to be parallel to or perpendicular to the axis of linear polarization, which is slanted, of the polarizing plate 21. This makes it possible to prevent leakage of light from occurring in the vicinity of the edge parts of the pixel potential lead-out electrodes 65.

The present application contains subject matter related to that disclosed in Japanese Priority Patent Application JP 2008-126706 filed in the Japan Patent Office on May 14, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A liquid crystal display comprising:
    a pair of substrates;
    a liquid crystal held between said substrates; and
    a polarizing plate disposed on at least one of said substrates, wherein,
        one of said substrates has a scan line, a signal line, a transparent pixel electrode disposed at an intersection of said scan line and said signal line, an active element which drives said transparent pixel electrode, and a wire for connecting said active element and said transparent pixel electrode,
        said polarizing plate has a linear polarization axis slanted in relation to said scan line,
        said active element has a drain electrode connected to said transparent pixel electrode,
        said wire and said drain electrode are respectively disposed at different layers, and
        said wire has an end part so shaped as to be slanted in a direction parallel to or perpendicular to said linear polarization axis.

2. The liquid crystal display according to claim 1, wherein said wire overlaps at least a portion of said drain electrode.

3. The liquid crystal display according to claim 1, wherein said wire comprises an intermediate electrode disposed between said drain electrode and said transparent pixel electrode, and said intermediate electrode has the end part so shaped as to be slanted in a direction parallel to or perpendicular to said linear polarization axis.

* * * * *